UNITED STATES PATENT OFFICE.

CONRAD SCHRAUBE AND ERHART SCHLEICHER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

AZO DYE.

No. 860,575.   Specification of Letters Patent.   Patented July 16, 1907.

Application filed April 9, 1907. Serial No. 367,253.

*To all whom it may concern:*

Be it known that we, CONRAD SCHRAUBE and ERHART SCHLEICHER, doctors of philosophy and chemists, subjects, respectively, of the King of Prussia and the Duke of Saxe-Meiningen, residing at Ludwigshafen-on-the-Rhine, Germany, have invented new and useful Improvements in Azo Coloring - Matters, of which the following is a specification.

Our invention relates to the manufacture of new azo coloring matters.

We have discovered that by combining a diazotized chlorin derivative of orthonitranilin with beta-naphthol, brilliant yellow-orange to orange-red coloring matters can be obtained which coloring matters are characterized by their insolubility in water, their fastness against the action of light, oil, and lime, and their capability of being used to great advantage and in the most varied manner for forming lakes. As instances of the chlorin derivatives of orthonitranilin which can be used in carrying out this invention, we mention 4-chlor-2-nitranilin and 5-chlor-2-nitranilin. The new coloring matters can be produced by combining the aforesaid diazo compounds with a solution of sodium betanaphtholate to which Turkey red oil, oleic acid, soap, or other similar reagent, has preferably been added. In order to prepare pigments, or lakes, from the said coloring matters, either the combination can be made to take place in the presence of one of the substrata usually used in forming pigments, or lakes, such for instance as aluminium hydrate and heavy spar, or the coloring matters can, after their formation, be mixed with a substratum either when in the form of a paste, or by grinding the two compounds together in the dry state.

Our new coloring matters possess the following characteristics. They are insoluble in water and are fast against the action of light, and when reduced by means of tin and hydrochloric acid they yield 4-chlor-1.2-phenylendiamin and 1.2-amidonaphthol.

The following example will serve to illustrate further the nature of our invention and how it can be carried into practical effect, but our invention is not confined to this example. The parts are by weight. Diazotize, in the usual manner, thirty-four and a half (34.5) parts of 4-chlor-2-nitranilin (or 5-chlor-2-nitranilin) and allow the diazo solution, if necessary after filtering it, to run, while well stirring, into a solution of twenty-nine (29) parts of beta-naphthol, twenty-five (25) parts of thirty-five (35) per cent. caustic soda solution and twenty-six (26) parts of Turkey red oil in seven hundred and fifty (750) parts of water to which two hundred and sixty (260) parts of a twenty-five (25) per cent. solution of crystallized sodium acetate have been added. The combination takes place very rapidly. Filter off the dyestuff which separates out and press it lightly. The same procedure can be followed when it is desired to prepare the coloring matter in the presence of a substratum, except that, in this case, the substratum is mixed with the sodium betanaphtholate and, if desired, with Turkey red oil, and sodium acetate, before the diazo solution is run in.

Now what we claim is:

1. As new articles of manufacture the azo coloring matters which can be obtained by combining a diazotized chlorin derivative of orthonitranilin with betanaphthol which coloring matters possess from yellow-orange to orange-red colors, are insoluble in water, are fast against the action of light, and upon reduction with tin and hydrochloric acid yield 4-chlor-1.2-phenylendiamin and 1.2-amidonaphthol.

2. As a new article of manufacture the azo coloring matter which can be obtained by combining diazotized 4-chlor-2-nitranilin with betanaphthol, which coloring matter possesses an orange-red color, is insoluble in water, is fast against the action of light, and upon reduction with tin and hydrochloric acid yields 4-chlor-1.2-phenylendiamin and 1.2-amidonaphthol.

In testimony whereof we have hereunto set our hands in the presence of two subscribing witnesses.

CONRAD SCHRAUBE.
ERHART SCHLEICHER.

Witnesses:
H. W. HARRIS.
J. ALEC LLOYD.